Patented May 28, 1946

2,401,169

UNITED STATES PATENT OFFICE 2,401,169

TREATMENT OF APPLE JUICES

Ray M. Laird, Rootstown, Ohio

No Drawing. Application January 31, 1944,
Serial No. 520,538

9 Claims. (Cl. 99—205)

This invention relates to an improved treatment of apple juices. More particularly it relates to the treatment of limed juices to convert the lime content to a quickly settling, crystalline precipitate and the separation of this precipitate from the juice. This may for example, be done by converting the lime to a carbonate or the like and is preferably done by gassing the limed juice with carbon dioxide or sulfur dioxide. After separating the precipitate thus formed the treated juice may be concentrated and during the concentration the juice may again be gassed to aid in the separation of foreign matter from the concentrate of high sugar content.

The concentration of the juice may be controlled to produce concentrates of different solids contents to be used for various purposes. Juices from ripe apples have a high sugar content, and in fact are sweeter than honey. They may be used for flavoring ice cream, beverages, etc. A thick syrup may be served with hot cakes. Confections may be made by adding powdered milk, powdered eggs, nuts, fruits, etc. to a heated juice of high solids content, e. g. a solids content of about ninety per cent or better, and allowing the mixture to solidify. In conditioning tobacco, juices of somewhat lower solids content are desired for use as a humectant, instead of glycerin.

The process is applicable to the treatment of the juice from all ripe apples, that is apples sufficiently ripe to have a sufficiently high sugar content for the desired use. The juice from different varieties of apples, or mixtures of varieties may be used. The process is also applicable to the treatment of unripe apples. The treatment may be applied to freshly pressed juice, or juice which has been frozen or preserved in any other manner. It is ordinarily applied to unconcentrated juices although the juices may first be heated for sterilization and some concentration is not objectionable.

The juices are preferably limed by adding a slurry of lime. As the acid content and pectin content vary, more or less lime will be required. A pH meter, preferably of the glass-electrode type with extension leads, may be used to control the amount of lime added. Indicators may likewise be used. The juice will advantageously be brought to a pH of 8 (plus or minus 0.2). It is to be understood that the removal of lime-produced precipitate is not limited to apple juices of this hydrogen concentration, but this example is given because such solutions are presently desired for obtaining products to meet commercial demands. Using a slurry of one pound of hydrated lime per gallon of water, about three pounds of slurry per 100 gallons of juice (unconcentrated) will ordinarily give satisfactory results.

In order to preserve the sugar content of the juice the liming will ordinarily be carried out at a temperature of at least about 78° F. If a lower temperature is used there is danger of precipitating a lime-sucrose compound. During the addition of the lime vigorous stirring is desirable to prevent localized action of the lime on the sugars.

After liming, the juice is advantageously heated, for example, to a temperature of about 175° F. to accelerate the action of the lime on the pectin. The lime also acts on the malic and other acids in the juice to form calcium malate, etc.

After liming, the juice is treated with a lime-precipitating agent. This is preferably done by gassing, although water solutions of the gases, etc. may be used. The preferred gassing agents are carbon dioxide and sulfur dioxide. These convert the lime content of the juice to a quickly settling precipitate which is allowed to settle. The juice is then preferably decanted although separation from the precipitate may be effected by filtration. The separation not only removes the crystalline lime compound formed from the excess lime but takes with it the reaction product of the lime and pectin and lime malate (whether or not these last mentioned lime products are crystalline or not), and foreign matters which cloud the untreated juice. This clarification process yields a clear, sparkling liquid.

If the precipitate is separated by decantation, the residue is advantageously subjected to filtration for the recovery of additional liquid which if not perfectly clear may be clarified by liming and then again precipitating a lime sludge.

The clarified liquid may be used without further treatment. Or it may be concentrated before use. If concentrated, the clarified liquid is advantageously further gassed during concentration to separate suspended foreign matter from the fruit sugars. Either carbon dioxide or sulfur dioxide may be used for this purpose. Any suitable concentration method may be employed. If a concentrate of high solids content is desired the juice is advantageously evaporated in my evaporator described in my application Ser. No. 477,759 filed March 2, 1943. In that equipment a concentrate with a solids content up to eighty-five, ninety or more per cent may be obtained. This evaporator is formed of a closed vessel equipped with a steam-heated helical coil mounted on a horizontal axis. As the evaporation proceeds, the rotating coil which dips into the juice keeps it stirred. As the coil rotates, the surfaces of the coil above the liquid expose a constantly changing surface of the liquid to hot gases blown through the upper portion of the evaporator. Efficient evaporation results without overheating.

According to a preferred method of treatment, the limed juice during concentration in such an evaporator or in similar equipment in which the liquid is not too vigorously agitated, is gassed with carbon dioxide or sulfur dioxide. This causes the sugars to come to the top of the container and a dark liquid separates in the bottom of the vessel which may be drained off after the upper contents of the vessel have become too thick to run. Perhaps such separation is due to acidification. In this manner a very thick, sticky, substantially non-runny product of a very high solids content may be obtained.

The following example illustrates the process:

About 150 gallons of fresh juice from various types of apples, such as Mackintosh, Winesap, etc., was heated to 175° F. To this I added 5 gallons of lime slurry prepared by adding 5 pounds of dehydrated lime to 6 gallons of water. This was then brought to a temperature of about 175° F. Then this solution was gassed by bubbling $CO_2$ gas into it. Almost immediately a precipitation of the lime compounds occurred which took with it suspended impurities. The cloud of precipitate quickly settled leaving a clear, sparkling liquid. The gassing was continued until no further precipitate formed. This brought the solution to a pH of about 7. The clarified liquid was then decanted from the precipitate.

The lime sludge left after decanting was filtered through a coarse bag. The filtrate was not clear, so it was limed and gassed to clarify it. It was then added to the other clarified liquid.

The clarified liquid was then concentrated in the evaporator described in my aforesaid patent application. By heating the evaporator coil with hot water at a temperature of only 190° F. plus or minus 10 degrees, charring was prevented. During concentration the solution was gassed with $CO_2$. This caused the separation of a dark liquid at the bottom of the vessel while the upper portion of the contents of the vessel thickened to a viscous mass on cooling. After drawing the black liquid out of the bottom of the vessel the light colored thickened mass was run out of the evaporator. It had a sweet fruity taste, entirely free of any caramelizing.

I claim:

1. The process of treating apply juice which comprises liming the same and then forming a readily separable lime precipitate in the juice at a sufficiently high temperature to prevent the separation of lime-sucrose compounds with an acidifying gas from the class consisting of carbon dioxide and sulphur dioxide and allowing the precipitate to settle therein and thereby simultaneously removing suspended matter from the juice.

2. The process of treating apple juice which comprises adding a lime slurry to the juice and heating to accelerate the action of the lime on the pectin in the juice, and then gassing at a sufficiently high temperature to prevent the separation of lime-sucrose compounds with an acidifying gas of the class consisting and carbon dioxide and sulfur dioxide to produce a lime precipitate and separating the precipitate thus formed from the juice.

3. The method of treating apple juice which comprises liming the juice to bring it to a pH of about 8 and then at a sufficiently high temperature to prevent the separation of lime-sucrose compounds and gassing with a gas from the class consisting of carbon dioxide and sulfur dioxide to convert the lime to a readily separable precipitate.

4. The method of treating apple juice which comprises liming the juice and then with the juice at a temperature of at least about 78° F. gassing with a gas from the class consisting of carbon dioxide and sulfur dioxide.

5. The method of treating apple juice which comprises liming the juice to a pH of about 8 and then with the juice at a temperature of at least about 78° F. gassing with a gas of the class consisting of carbon dioxide and sulfur dioxide.

6. The method of treating apple juice which comprises liming the same, then forming a readily separable lime precipitate therein at a sufficiently high temperature to prevent the separation of lime-sucrose compounds, and after separating the precipitate concentrating by evaporation, and then gassing the thickened concentrate with an acidifying gas from the class consisting of carbon dioxide and sulphur dioxide to cause settling of a black liquid from the supernatant concentrate.

7. The method of treating a limed apple juice which comprises concentrating by evaporation and gassing with a gas of the class consisting of carbon dioxide and sulfur dioxide to aid in the separation of the sugars from the liquid therein.

8. The process of claim 2 in which the acidifying gas used is carbon dioxide.

9. The process of claim 2 in which the acidifying gas used is sulfur dioxide.

RAY M. LAIRD.